United States Patent Office 2,891,224
Patented June 16, 1959

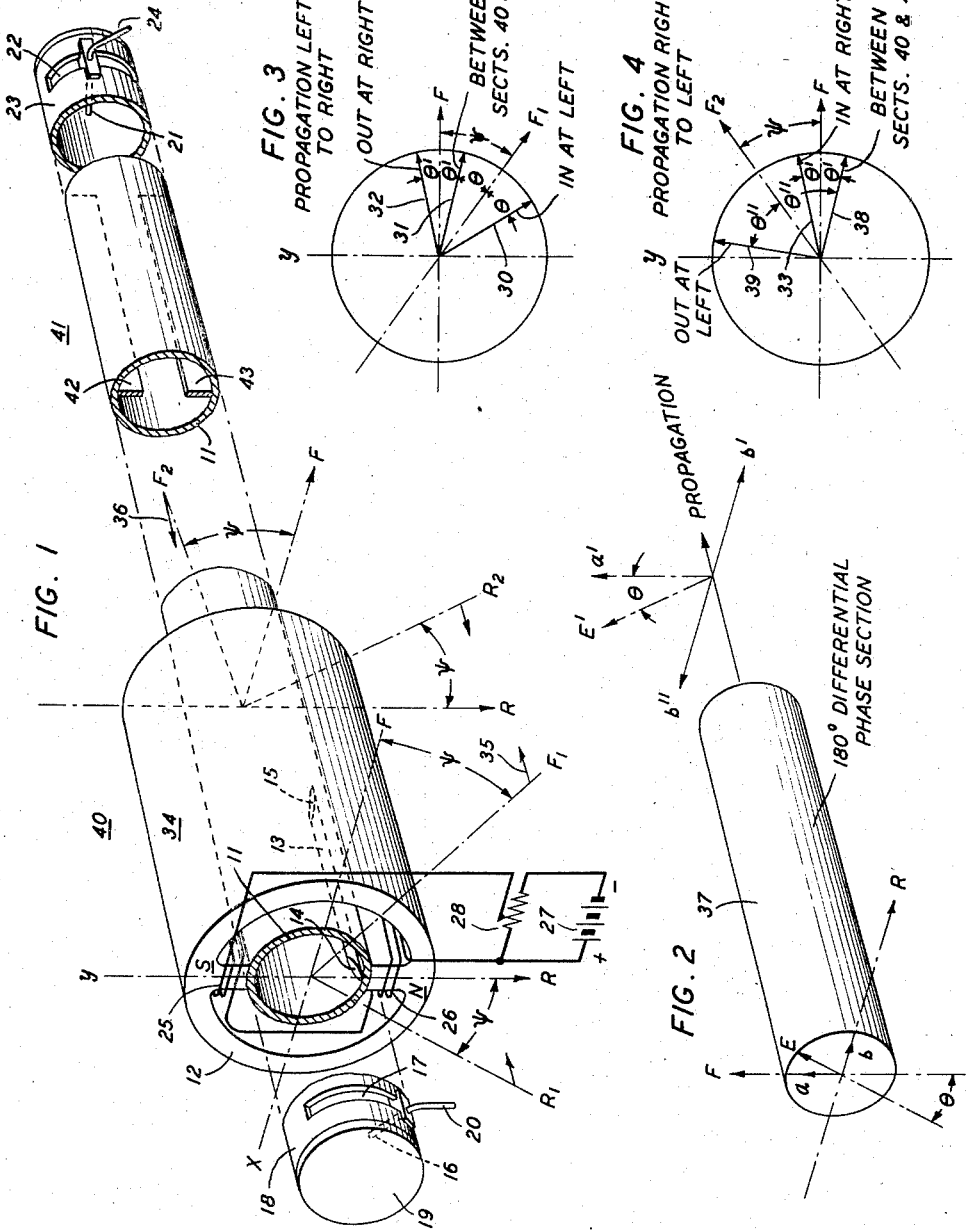

2,891,224

NON-RECIPROCAL WAVE TRANSMISSION

Arthur G. Fox, Rumson, N.J., assignor to Bell Telephone Laboratories, Incorporated, New York, N.Y., a corporation of New York Application June 10, 1953, Serial No. 360,795

5 Claims. (Cl. 333—98)

This invention relates to non-reciprocal wave transmission devices and, more particularly, to devices producing an antireciprocal Faraday-effect rotation of the plane of polarization of plane polarized electromagnetic wave energy.

There are several different phenomena each which involve a rotation of the plane of polarization of polarized wave energy. Each of these have interesting similarities and important differences. As is well known, transmission of plane polarized energy through a "birefringent" or "birefractive" medium of suitable thickness, as for example a medium composed of one of several crystalline materials, will rotate the plane of polarization of the energy. This phenomenon was first observed in connection with polarized light waves and much of the optical terminology has been carried over into the analysis of devices operating with other forms of wave energy. In the case of electromagnetic wave energy the particular type of birefringent device suitable therefor has been more descriptively referred to as a "180 degree differential phase shift section." A birefringent rotation is reciprocal in that the rotation of a wave experienced in passing through the medium in a first direction will be cancelled if the wave is reflected back through the medium to the source.

Another known type of rotation has been called antireciprocal to distinguish it from the reciprocal rotation produced by the birefringent medium. In an antireciprocal rotation the angle of rotation continues in the same direction when the wave is reflected back along its path. Thus, the polarization of a wave passing through the medium first in one direction and then in the other undergoes two successive space rotations in the same sense, thereby doubling the rotating undergone in a single passage. The most common form of antireciprocal rotation is that produced by a "Faraday-effect" element. For this reason, it is often referred to as a Faraday rotation.

In an article, "The Microwave Gyrator," in the Bell System Technical Journal, January 1952, and in his copending application for patent, Serial No. 252,432, filed October 22, 1951, now United States Patent 2,748,353, granted May 29, 1956, C. L. Hogan disclosed that an element of ferromagnetic material in the presence of a magnetic field produces an antireciprocal rotation of a plane polarized electromagnetic wave when the wave is propagated parallel to and along the direction of the magnetic field.

In the copending application of E. H. Turner, Serial No. 339,289, filed February 27, 1953, there is disclosed a medium producing a "non-reciprocal rotation" of wave energy. This medium comprises a 180 degree differential phase shift section which employs as the active element therein an element of ferromagnetic material. As in prior birefringent devices, a controllable rotation of the plane of polarization of electromagnetic wave energy is produced when the wave is passed through the medium. This rotation is dependent upon the relationship between the incident polarization of the energy and the birefringent axes of the section. However, because of the unusual properties of the ferromagnetic material in the presence of a magnetic field; and because of the particular physical relationship provided between the ferromagnetic element, the applied magnetic field and the field pattern of the wave energy, the birefringent axes for opposite directions of transmission through the rotator are displaced from one another by an amount proportional to the strength of the magnetic field. With proper adjustment, as will be described in detail hereinafter, the non-reciprocal angle of rotation for each direction of transmission through the rotator may be separately selected. As a particular case, it is possible to make these angles equal and in such a case, the rotation is in many respects equivalent to the antireciprocal rotation of the Faraday effect. It is not a true Faraday effect rotation even in this case, however, since it obtains only for a predetermined polarization of the incident energy.

It is an object of the present invention to produce an antireciprocal rotation of plane polarized electromagnetic wave energy by new and improved apparatus.

It is a further object of the invention to convert a non-reciprocal birefringent rotation into an antireciprocal rotation independent of the incident polarization of the wave energy.

These and other objects of the invention, the nature of the present invention, its features and its advantages, will appear more fully upon consideration of the various specific illustrative embodiments shown in the accompanying drawings and the following detailed description of these embodiments.

In the drawings:

Fig. 1 is a perspective view of an antireciprocal rotator for electromagnetic wave energy in accordance with the invention;

Fig. 2, given for the purpose of explanation, is a schematic representation of a reciprocal 180 degree differential phase shift rotator;

Fig. 3 is a vector representation of wave energy polarizations in the rotator of Fig. 1 for propagation from left to right therethrough; and Fig. 4 is a vector representation of wave energy polarizations in the rotator of Fig. 1 for propagation from right to left therethrough.

In more detail, Fig. 1 illustrates an embodiment of an antireciprocal rotator in accordance with the invention comprising a section 11 of metallic shield transmission line or wave guide which may either be square or of circular cross-section as illustrated. In either event the cross-sectional dimension of guide 11 is preferably chosen so that only the various polarizations of the dominant mode of wave energy therein can be propagated. For the purposes of the present disclosure, guide 11 may be divided into two sections 40 and 41. Section 40 includes a non-reciprocal birefringent transmission medium of the type disclosed and claimed in the above-identified application of E. H. Turner. Section 41 is a reciprocal birefringent transmission medium. Both sections will be considered in detail separately hereinafter as to their constructional details and their operation. Their combined operation to produce an antireciprocal rotation will also be detailed.

Guide 11, including both sections 40 and 41, is adapted to be interposed between suitable transmission means for coupling linearly polarized electromagnetic waves with any desired polarization to guide 11. This means is illustrated schematically on Fig. 1 by a radial probe 16 extending through a circumferential slot 17 in the wall of extension 18 of guide 11. Probe 16 is located an appropriate distance from end plate 19 of extension 18 to launch those waves only in guide 11 that are polarized in the plane of the probe. Probe 16 is connected to a related transmission system by flexible conductor 20 so that the probe may be inclined in extension 18 at any desired angle. A similar probe 21, extending through slot 22, is located at the other end of guide 11 in extension 23 thereof to abstract waves from guide 11 having a polarization parallel to probe 21 and apply them to conductor 24. A plurality of such probes may be employed, if desired, at either end to accept and launch waves of other polarizations.

Surrounding the non-reciprocal portion 40 of guide 11 is a suitable means for producing an adjustable magnetic field, transverse to the axis of guide 11. As illustrated, this field passes through guide 11 in a vertical direction and is supplied by solenoid structure 34 comprising a suitable core 12 having concentrated pole pieces N and S bearing against the outside wall of guide 11 along narrow, oppositely disposed areas. Turns of wire 25 and 26 are placed about the pole pieces and are energized by a variable direct current from a source comprising rheostat 28 and battery 27. This field, however, may be supplied by an electrical solenoid with a metallic core of other suitable physical design or by a solenoid without a core. Furthermore, the field may be supplied by a permanent magnet of suitable strength.

Located along the lower inside wall surface of guide 11 and extending longitudinally therein for several wavelengths in the presence of the field from magnet 12 is a strip-like or rod-like element 13 of ferromagnetic material. A suitable shape for element 13 may be arrived at by starting with a cylinder of ferromagnetic material of cross-sectional dimension small with respect to the cross-section of guide 11, sanding or otherwise suitably cutting a longitudinal flat on one side to fit snugly against the internal surface of guide 11 and cutting pointed tapers 14 and 15 at each of the ends of element 13. Element 13 is suitably bonded in this position to the inside wall of guide 11.

Element 13 may be made of any of the several ferromagnetic materials which each comprise an iron oxide with a small quantity of a bivalent metal such as nickel, magnesium, zinc, manganese or other similar material, in which the other metals combine with the iron oxide in a spinel structure. This material is known as a ferromagnetic spinel or a ferrite. These materials may be solid or they may be first powdered and then molded with a small percentage of plastic material, such as Teflon or polystyrene. As a specific example, element 13 may be a strip of nickel-zinc ferrite prepared in the manner described in the above-mentioned publication and copending application of C. L. Hogan.

The reciprocal portion 41 of guide 11 may be a differential phase shift section of any of the types disclosed, for example, in "Principles and Applications of Waveguide Transmission" by G. C. Southworth, 1950, pages 327 through 331. In the particular embodiment illustrated in Fig. 1, this section comprises radially disposed vanes 42 and 43 of dielectric material, such as polystyrene, extending vertically in guide 11. Two vanes are illustrated that extend a portion of the way into the guide, but a single vane extending part or all of the way across would be equally satisfactory. Each vane may be tapered or introduced by a quarter-wave transformer to prevent reflection loss at the edges thereof.

The length and thickness of element 13 in section 40 in the absence of a magnetic field and the length and thickness of vanes 42 and 43 in section 41 are independently adjusted to produce 180 degree differential phase shift sections that each have the property of producing a time phase delay which is greatest to wave energy having its lines of electric force parallel to the plane of a principal axis of the section and least to wave energy perpendicular to this plane, and therefore, to introduce a time phase difference between the two components by retarding one relative to the other. These axes and the planes in which they lie correspond to the axes of refraction of a conventional birefringent transmission medium. Since element 13 in section 40 and vanes 42 and 43 in section 41 each have a dielectric constant which is substantially greater than unity and since the phase velocity of a wave is influenced by the dielectric constant presented by the material to the component of the electric vector of the wave which passes through the material, a vertically polarized wave passing through guide 11 will exhibit a lower phase velocity than a horizontally polarized wave. This is illustrated in Fig. 1 by a horizontal axis F representing the fast axis of propagation through guide 11 and a vertical axis R representing the retarded axis of propagation. In accordance with the invention, the relative phase shift between two linearly polarized wave components having their polarizations parallel to axes F and R, respectively, is approximately equal to 180 degrees in the absence of a magnetic field in section 40, and is equal to 180 degrees in section 41.

Thus far, the effect of the dielectric constant of element 13 in section 40 has been considered alone by assuming a magnetic field of zero. As the ferromagnetic material of element 13 is excited by a transverse magnetic field, such as produced by magnet means 34, the permeability constant of the material will change for wave energy components having a given polarization relative to the magnetic field. This may be explained theoretically by the assumption that the ferromagnetic material contains unpaired electron spins which tend to line up with the applied magnetic field. These spins and their associated moments then precess about the line of the applied magnetic field, keeping an essentially constant component of magnetic moment in the applied field direction but providing a magnetic moment which rotates about the applied field direction. An electromagnetic wave having its magnetic vector in the direction of the magnetic field will be unable to reorient the electron spins to any appreciable extent, and hence, will see a permeability close to unity regardless of the strength of the magnetic field. An electromagnetic wave having a magnetic vector component which rotates predominantly counter-clockwise in a plane normal to the applied magnetic field when viewed from the north pole of the magnet producing the field will have its magnetic field influenced by element 13 so that element 13 presents to such a wave a permeability greater than unity. On the other hand, a wave having a magnetic vector component which rotates in a predominantly clockwise sense when viewed in the same fashion will be similarly influenced but element 13 will have for such a wave a permeability less than unity (assuming that the applied magnetic field strength is lower than that required for ferromagnetic resonance). The amount of difference from unity in each case will depend on the strength of the magnetic field which may be adjusted to the precise value to be defined hereinafter in the region below that strength which produces ferromagnetic resonance in element 13 at the frequency of the applied wave energy. As described in detail in the above-mentioned Hogan publication, when the field necessary for ferromagnetic resonance is approached, the attenuation of the clockwise rotating component becomes larger and larger until eventually only the counterclockwise rotating component will be propagated. Thus a field strength in this region must be avoided. Element 13 may obviously be permanently magnetized to any particular predetermined strength if desired.

Consider now the effect in section 40 of this permeability of element 13 alone upon an electromagnetic wave, overlooking for the moment the dielectric effect of element 13 described above. Thus, if a linearly polarized dominant mode wave is applied at the left end of guide 11 polarized at an arbitrary acute angle Ψ with respect to the axis F, such as a polarization represented by the axis $F_1$ of Fig. 1, this wave will have a magnetic field component at the position of element 13 which changes direction as the wave travels and will be circularly polarized, i.e., will appear to rotate 360 degrees during the time taken for the wave to travel one wavelength. This wave has a magnetic field component at the position of element 13 which rotates clockwise when viewed from the direction of the magnetic pole N looking towards pole S. If a similar wave is applied to guide 11 polarized at an arbitrary acute angle $\Psi$ with respect to the axis R, such as represented by the axis labeled $R_1$ of Fig. 1, this wave will have a magnetic component which rotates counter-clockwise when viewed from pole N. In general, there will also be a change in magnitude of the magnetic vector as it rotates, but the sense of rotation determines whether the permeability of element 13 will be greater than or less than unity in an applied magnetic field. Since the phase velocity of a wave whose magnetic field passes through a material depends on the permeability constant of the material, a wave traversing the ferromagnetic material of element 13 with its electric vector polarized parallel to $F_1$ will exhibit a higher phase velocity than that of a wave polarized parallel to $R_1$. Thus, the effect of the permeability of the magnetized ferrite alone, produces a maximum phase velocity for a wave propagating from left to right which is polarized at 45 degrees between the axes R and F in the lower forward quadrant of Fig. 1. The corresponding minimum phase velocity is found for waves polarized at 45 degrees in the lower-back quadrant of Fig. 1. As the applied field is increased from zero, the smaller phase velocity decreases and the larger increases.

The total effect of both the dielectric and permeability phenomena may now be considered. As noted above in the discussion of the dielectric effect alone, of the various possible planes of polarization, the wave with its electric vector polarized along axis R has the lowest phase velocity in the absence of an applied magnetic field due to the dielectric constant of element 13. For this polarization the permeability constant of element 13 is unity when the applied magnetic field is zero. Since the effect of the dielectric is constant and tends to cause a minimum phase velocity in the plane of the axis R, the superposition of the dielectric and permeability effects causes an actual minimum phase velocity to occur along the axis $R_1$ which is displaced from the axis R by an angle $\Psi$ proportional to the strength of the magnetic field. As the applied magnetic field is increased, the permeability effect is increased, and the angle $\Psi$ increases up to a maximum of 45 degrees. This maximum angle of rotation of the axes represents the purely magnetic birefringence.

With a magnetic field of the polarization illustrated in Fig. 1, the fast and slow axes $F_1$ and $R_1$, respectively, for transmission from left to right are rotated clockwise as viewed facing in the direction of propagation of the wave. Similarly, for a wave propogating from right to left by an argument identical with that used for propagation from left to right and with a magnetic field applied as indicated in Fig. 1, the axes of fast and retarded phase velocity will be shifted clockwise from their zero field positions since a wave propagating in this right to left direction will have circularly polarized magnetic field components at the position of element 13 which rotate in the opposite sense from the corresponding components of the wave analyzed for propagation from left to right. Thus, in space the absolute rotations of the birefringent axes of phase shift are opposite for opposite directions of propagation, i.e., the fast axis, labeled $F_1$ on Fig. 1, for propagation through guide 11 from left to right (indicated by arrow 35) is shifted into the lower-forward quadrant, while the fast axis, labeled $F_2$ on Fig. 1, for propagation from right to left (indicated by arrow 36) is shifted into the upper-forward quadrant. The retarded axes, labeled $R_1$ and $R_2$, respectively, are similarly shifted. A reversal of the polarity of the magnetic field will reverse the direction of shift. While the absolute magnitude of the phase shift along any axis changes with change in the applied field, the relative difference between the slow and fast axes, for transmission through the portion 40 of guide 11 which includes element 13, remains substantially at the 180 degrees in time phase as was found in the absence of a magnetic field.

Carrying over the optical terminology, guide 11 and element 13 when excited by a transverse magnetic field remain a birefringent transmission medium, except, however, that the axes of refraction for one direction of propagation through the medium are different from the axes of refraction for the opposite direction of propagation. In electrical terms, the plane of greatest phase velocity of the 180 degree differential phase shift section encountered by wave energy passing through the section in one direction is inclined at an angle to the plane of greatest phase velocity for the opposite direction of transmission through the section.

Before proceeding with the detailed examination of the space rotations produced by the antireciprocal rotator of Fig. 1, certain properties of an ordinary 180 degree differential phase shift section must be examined. This examination may most readily be made with reference to the schematic representation of Fig. 2 which shows the 180 degree differential phase shift element 37 having a fast axis F, designating the electric polarization of wave energy having the greatest phase velocity, extending vertically through the element and a retarded axis R, designating the electric polarization of wave energy of least phase velocity, extending horizontally through the element. This examination will, therefore, illustrate the effect of section 40 for one given direction of propagation therethrough and for section 41 for both directions of propagation therethrough.

Referring, therefore, to Fig. 2, assume that linearly polarized waves represented by the vector E are being introduced from the left of the section, and that these waves are polarized at an angle $\theta$ clockwise from axis F. Vector E may be resolved into components $a$ and $b$ along axes F and R, as shown on Fig. 2. Since the F axis component travels at a higher speed than the R axis component, upon emerging from the right end of the section, vector $b'$ lags behind $a'$ by 180 degrees in time. Hence, at the position of $a'$, the R axis component will be reversed in time phase and so will be pointing in the opposite direction, as indicated by $b''$. Now when $a'$ and $b''$ are added vectorially, the resultant will be a linearly polarized wave represented by E' polarized at an angle $\theta$ counterclockwise from the fast axis F. Thus, the effect of the 180 degree differential phase shift section upon linearly polarized waves is to cause a reciprocal rotation of the angle of polarization in the direction of the fast axis by $2\theta$, or twice the angle between the fast axis and the input polarization. The retarded axis could equally well have been chosen as the reference axis and the same result would have been obtained, but for the purposes of convenience the fast axis will be employed as the sole reference in the discussion which follows.

With this property of a reciprocal 180 degree differential phase shift section in mind, the operation of the rotator of Fig. 1, in accordance with the invention, may be explained with reference to the vector diagrams of Figs. 3 and 4. Thus, on Fig. 3 the shifted fast axis $F_1$ for propagation through section 40 from left to right is illustrated. The angle $\Psi$ which the axis $F_1$ makes with the $x$ axis is determined by the strength of the applied transverse magnetic field. The fixed fast axis F for propagation through section 41 of guide 11 is also illustrated. Assume that a linearly polarized wave of arbitrary space polarization such as that generated by probe 16 of Fig. 1 is applied at the left of guide 11.

This is represented by vector 30 on Fig. 3 which makes an angle $\theta$ with the $F_1$ axis. The effect of the differential phase shift property of section 40 is to cause a rotation of the polarization of wave energy in the direction of the $F_1$ axis by $2\theta$ placing the polarization of wave energy between sections 40 and 41 at that represented by vector 31 on Fig. 3. The linearly polarized wave then enters section 41 making an angle $\theta'$ with the F axis of this section. The effect of the differential phase shift property of section 41 is to cause a rotation of the polarization of wave energy in the direction of the F axis by $2\theta'$, placing the polarization of wave energy leaving the right-hand end of guide 11 at that represented by vector 32 for reception by probe 21.

Thus, the total space rotation for propagation from left to right is the angle between vector 30 and 32 on Fig. 3 which is equal to:

$$2\theta + 2\theta' \qquad (1)$$

but $$\theta' = \Psi - \theta \qquad (2)$$

so that the total left to right rotation may be expressed:

$$2\theta + 2(\Psi - \theta) = 2\Psi \qquad (3)$$

or twice the angle of shift produced by the magnetic field of the fast axis $F_1$ from its no field position F.

Now, assume that a linearly polarized wave having the same polarization as the wave heretofore described as leaving the right-hand end of guide 11 be applied to the right-hand end of guide 11 by probe 21. This wave is represented on Fig. 4 by vector 33, which makes an angle $\theta'$ with the fast axis F of section 41. The effect of the differential phase shift property of section 41 is to cause a rotation of the polarization of wave energy in the direction of the F axis by $2\theta'$ placing the polarization of wave energy between sections 40 and 41 at that represented by vector 38. For propagation from right to left through section 40, the fast axis of propagation is represented by the axis $F_2$ on Fig. 4 which makes an angle $\Psi$ with the $x$ axis but on the other side thereof from the corresponding angle in Fig. 3. The angle $\theta''$ represents the angle between vector 38 and the $F_2$ axis. The effect of the differnetial phase shift property is to cause a further rotation of the angle of polarization in the direction of the $F_2$ axis by $2\theta''$ placing the polarization of wave energy leaving the left-hand end of guide 11 at that represented by vector 39 displaced from the position of probe 16. Considering the angles on Fig. 4, it will be seen that the total space rotation for propagation from right to left is equal to:

$$\theta'' + \Psi - \theta' \qquad (4)$$

but $$\theta'' = \Psi + \theta' \qquad (5)$$

so that the space rotation from right to left may be expressed:

$$(\Psi + \theta') + \Psi - \theta' = 2\Psi \qquad (6)$$

or the same angle of shift and in the same sense experienced for propagation from left to right. This is an antireciprocal rotation.

The antireciprocal rotator of the present invention may, therefore, replace the rotators in the combinations disclosed by Hogan in the above-mentioned publication and copending application, and in other devices known to the art which make use of the antireciprocal rotation obtained by Faraday-effect devices. Without in any way attempting to mention more than a few typical examples of this possible substitution for the purposes of illustration, it may be noted that the rotator of the present invention may be employed in the combinations disclosed in applicant's copending applications, Serial No. 288,288, filed May 16, 1952, now United States Patent 2,832,054 granted April 22, 1958; Serial No. 263,629, filed December 27, 1951, now United States Patent 2,760,166 granted August 21, 1956; Serial No. 263,630, filed December 27, 1951, now United States Patent 2,746,014 granted May 15, 1956; in the copending application of W. W. Mumford, Serial No. 263,656, filed December 27, 1951, now United States Patent 2,769,960 granted November 6, 1956; and in the copending application of S. E. Miller, Serial No. 263,600, filed December 27, 1951, now United States Patent 2,748,352 granted May 29, 1956.

Several advantages of such substitution may be mentioned. In the prior art Faraday-effect devices, a ferromagnetic element is placed in the center of the wave guide and in the center of the electromagnetic field pattern so that substantial components of the energy must pass through the element. Since the ferromagnetic materials inherently have a certain amount of loss, a certain amount of the wave power may be dissipated in the material presenting the consequent problem of transfer of the heat produced thereby away from the element. In the present structure, however, the ferromagnetic material is located at the side of the guide resulting in a smaller amount of the wave energy being dissipated in the material. Furthermore, since the ferromagnetic material is in contact with the wave-guide walls, the problem of heat dissipation is minimized.

In all cases, it is understood that the abovedescribed arrangements are simply illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An antireciprocal rotator of the plane of polarization of plane polarized wave energy, said rotator comprising a first birefringent transmission medium adapted to support said energy in a plurality of polarizations at the operating frequency and to shift the phase of energy polarized in a plane of maximum phase shift to a greater extent than wave energy polarized in a plane of minimum phase shift that is perpendicular to said plane of maximum phase shift, said first medium having a plane of maximum phase shift for one direction of propagation that is different from the plane of maximum phase shift for the opposite direction of propagation of said energy therethrough, and a second birefringent transmission medium adapted to support said energy and having the same plane of maximum phase shift for both directions of propagation, the plane of maximum phase shift of said second medium being aligned mid-way between said respectively different planes of maximum phase shift of said first medium.

2. An antireciprocal rotator of the plane of polarization of plane polarized wave energy, said rotator comprising in combination a 180 degree differential phase shift section adapted to support said energy having a plane of maximum phase shift for one direction of propagation which is different from the plane of maximum phase shift for wave energy propagated in the opposite direction through said section and therefore capable of producing a rotation of the polarization of said wave energy of a first degree for said one direction and a second and different degree for said opposite direction, and a 180 degree differential phase shift section adapted to support said energy having the same plane of maximum phase shift for opposite directions of propagation therethrough and therefore capable of producing a rotation of the polarization of said wave energy of a third degree equally for both said directions, said sections being oriented with respect to each other so that said first and third degrees are additive for said one direction and said second and third degrees are subtractive for said opposite direction.

3. In combination, a section of metallic shield microwave transmission line adapted to support electromagnetic wave energy in a plurality of polarizations at the operating frequency, an elongated member of magnetically polarizable material exhibiting the gyromagnetic effect at the frequency of wave energy supported by said line disposed in an off-center position in said line where the magnetic field components of said energy appear to rotate in respectively opposite senses for opposite directions of propagation, means for applying a magnetic field to said member perpendicular to the axis of said line, and a 180 degree differential phase shift section in said line having the plane of greater phase shift thereof aligned with a longitudinal plane of said transmission line passing through said member and through the longitudinal axis of said line.

4. In a transmission system for high frequency electromagnetic wave energy, a first element located in the path of said energy where the magnetic field components of said energy appear to rotate in respectively opposite senses for opposite directions of propagation along said path, said element having a permeability constant dependent upon the intensity of magnetization of said element, said element having a fixed dielectric constant, the size of said element and the value of said dielectric constant retarding the phase of wave energy components polarized in one plane through said element substantially 180 degrees with respect to components polarized perpendicular to said plane when the permeability constant of said element is substantially unity, means for increasing the intensity of magnetization of said element to increase the permeability thereof to retard the phase of wave components polarized at an acute angle to said plane on one side of said plane and to decrease the permeability thereof to advance the phase of wave components polarized at an acute angle on the other side of said plane, and a second element having fixed permeability and dielectric constants, the size of said element and the value of said dielectric and permeability constants retarding the phase of wave energy components polarized in said one plane substantially 180 degrees with respect to components polarized perpendicular to said plane.

5. In combination, a section of wave guide adapted to support electromagnetic wave energy in a plurality of planes of polarization, first and second polarization-selective wave-guide connections to said guide, said first connection adapted to couple to and from a first plane of polarization of said energy in said guide, said second connection adapted to couple to and from a second and different plane of polarization of said energy in said guide, means interposed in said guide between said connections for rotating the polarization of wave energy passing therebetween from said first plane into said second plane for transmission from said first connection to said second connection and into a plane other than said first plane of polarization for transmission in the opposite direction from said second connection, said means comprising a non-reciprocal birefringent transmission medium having a plane of maximum phase shift for one direction of propagation that is different from said plane of maximum phase shift for the opposite direction of propagation of said energy therethrough, and a reciprocal birefringent transmission medium having the same plane of maximum phase shift for opposite directions of propagation therethrough, the plane of said reciprocal medium being inclined mid-way between said different planes of said non-reciprocal medium.

References Cited in the file of this patent

UNITED STATES PATENTS

| | | |
|---|---|---|
| 2,532,157 | Evans | Nov. 28, 1950 |
| 2,546,840 | Tyrrell | Mar. 27, 1951 |
| 2,599,753 | Fox | June 10, 1952 |
| 2,607,849 | Purcell | Aug. 19, 1952 |
| 2,644,930 | Luhrs | July 7, 1953 |
| 2,650,350 | Heath | Aug. 25, 1953 |
| 2,741,744 | Driscoll | Apr. 10, 1956 |
| 2,748,353 | Hogan | May 29, 1956 |

OTHER REFERENCES

Publication I, Sakiotis et al.: "Microwave-Antenna Ferrite Applications," Electronics, June 1952, pages 156, 158, 162 and 166.

Kales et al.: "A Nonreciprocal Microwave Component," Journal of Applied Physics, vol. 24, No. 6, June 1953, pp. 816–17. (Article received Mar. 30, 1953.)

Darrow: Bell System Technical Journal, vol. 32, Nos. 1 and 2, January and March 1953, pp. 74–99 and 384–405. (Copy in Scientific Library.)

Spectroscopy at Radio and Microwave Frequencies (D. J. E. Ingram), published by Butterworths Scientific Publications (London) 1955, page 215 relied on. (Copy in Scientific Library.)